United States Patent
Meng et al.

(10) Patent No.: US 10,844,508 B2
(45) Date of Patent: Nov. 24, 2020

(54) METHOD FOR MAKING NANOPOROUS COPPER

(71) Applicants: Tsinghua University, Beijing (CN); HON HAI PRECISION INDUSTRY CO., LTD., New Taipei (TW)

(72) Inventors: Yue-Feng Meng, Beijing (CN); Lun-Qiao Xiong, Beijing (CN); Yuan-Feng Liu, Beijing (CN); Ze-Cheng Hou, Beijing (CN); Hong-Ying Fu, Beijing (CN); Lin Zhu, Beijing (CN); Wen-Zhen Li, Beijing (CN)

(73) Assignees: Tsinghua University, Beijing (CN); HON HAI PRECISION INDUSTRY CO., LTD., New Taipei (TW)

(*) Notice: Subject to any disclaimer, the term of this patent is extended or adjusted under 35 U.S.C. 154(b) by 214 days.

(21) Appl. No.: 16/137,570

(22) Filed: Sep. 21, 2018

(65) Prior Publication Data
US 2019/0203376 A1    Jul. 4, 2019

(30) Foreign Application Priority Data
Dec. 29, 2017 (CN) ............................ 201711476283

(51) Int. Cl.
| | |
|---|---|
| C25F 3/02 | (2006.01) |
| C22C 9/00 | (2006.01) |
| C22C 9/01 | (2006.01) |
| C22C 9/06 | (2006.01) |
| C22C 9/04 | (2006.01) |

(52) U.S. Cl.
CPC ............ *C25F 3/02* (2013.01); *C22C 9/00* (2013.01); *C22C 9/01* (2013.01); *C22C 9/04* (2013.01); *C22C 9/06* (2013.01)

(58) Field of Classification Search
CPC ..... C25F 3/02; C22C 9/00; C22C 9/01; C22C 9/04; C22C 9/06
See application file for complete search history.

(56) References Cited

U.S. PATENT DOCUMENTS

| | | | |
|---|---|---|---|
| 10,626,518 B2* | 4/2020 | Zhan | C25D 3/56 |
| 2009/0081408 A1 | 3/2009 | Chan et al. | |
| 2017/0263938 A1* | 9/2017 | Harutyunyan | H01M 4/134 |
| 2018/0354168 A1 | 12/2018 | Van Der Burgt et al. | |
| 2019/0316243 A1* | 10/2019 | Yuan | B22D 7/005 |

FOREIGN PATENT DOCUMENTS

| | | |
|---|---|---|
| CN | 101391500 A | 3/2009 |
| CN | 101791885 A | 8/2010 |
| TW | 201731658 A | 9/2017 |

* cited by examiner

*Primary Examiner* — Nicholas A Smith
(74) *Attorney, Agent, or Firm* — ScienBiziP, P.C.

(57) ABSTRACT

A method of making a nanoporous copper is provided. A copper alloy layer and at least one active metal layer are provided. The copper alloy layer comprises a first surface and a second surface. The at least one active metal layer is located on the first surface and the second surface to form a structure. The structure is processed to form a composite structure. A process of folding and pressing the composite structure is repeated to form a precursor. The precursor is corroded to form the nanoporous copper.

19 Claims, 8 Drawing Sheets

METHOD FOR MAKING NANOPOROUS COPPER

CROSS-REFERENCE TO RELATED APPLICATIONS

This application claims all benefits accruing under 35 U.S.C. § 119 from China Patent Application No. 201711476283.7, filed on Dec. 29, 2017, in the China Intellectual Property Office, the contents of which are hereby incorporated by reference.

FIELD

The present disclosure relates to a method for making nanoporous copper.

BACKGROUND

Since nanoporous coppers have high nano-effects, high specific surface area, high permeability, high electrical conductivity and high thermal conductivity, nanoporous coppers have excellent performance in energy, photoelectric conversion, electrochemistry, and catalysis fields. Especially, in the catalysis field, nanoporous coppers have high efficiency and stability. Therefore, providing a simple and low-cost method for making nanoporous copper has a great practical value.

Conventional nanoporous coppers are usually obtained by a dealloying method. The dealloying method utilizes a principle of chemical or electrochemical corrosion to make the electrochemically active elements in an alloy dissolve into electrolyte. In order to make the active metal elements dissolve faster in a dealloying process and obtain a porous material with a uniform pore size, a copper alloy precursor before the dealloying process is required having fine grain size and high defect density. Currently, strip casting is usually used to form a copper alloy precursor. However, the preparation cost of conventional strip casting is high and the operation is complicated.

Therefore, there is room for improvement within the art.

BRIEF DESCRIPTION OF THE DRAWINGS

Implementations of the present technology will now be described, by way of example only, with reference to the attached figures, wherein.

DETAILED DESCRIPTION

Figure 1:
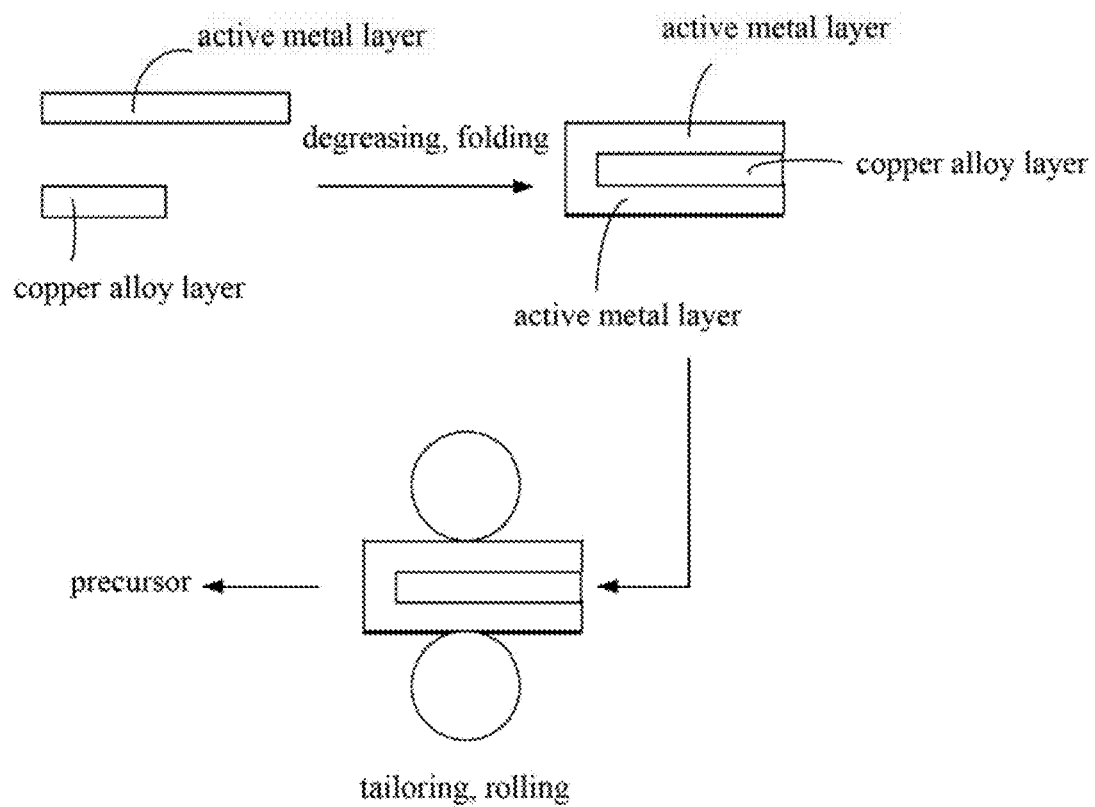
FIG. 1 is a flow diagram of one embodiment of a method for making nanoporous copper.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

Figure 2:
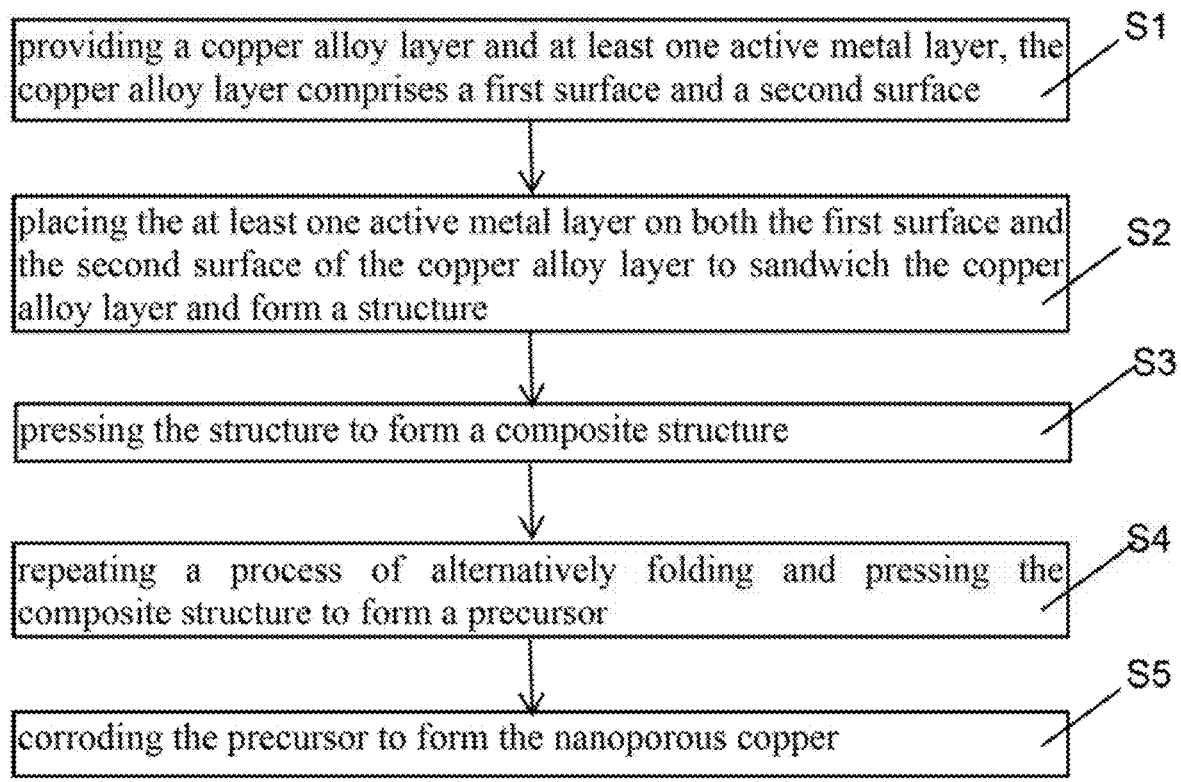
FIG. 2 is a flow diagram of one embodiment of a method for making nanoporous copper.

In FIG. 1 and FIG. 2, one embodiment is described in relation to a method for making nanoporous copper. The method comprises steps of:

step (S1), providing a copper alloy layer and at least one active metal layer, the copper alloy layer comprises a first surface and a second surface;

step (S2), placing the at least one active metal layer on both the first surface and the second surface of the copper alloy layer to sandwich the copper alloy layer and form a structure;

step (S3), pressing the structure to form a composite structure;

step (S4), repeating a process of alternatively folding and pressing the composite structure to form a precursor; and step (S5), corroding the precursor to form the nanoporous copper.

In step (S1), a material of the copper alloy layer comprises a metal copper and alloy elements. The alloy elements comprise an active metal element. The active metal element can be, but not limited to, any one of zinc, aluminum, and nickel. The copper alloy layer can be a commercially available copper alloy layer, or can be prepared as needed. In one embodiment, a thickness of the copper alloy layer is about 0.03 millimeters to about 3 millimeters.

In one embodiment, the copper alloy layer further comprises a reinforcement. The reinforcement is dispersed in the copper alloy layer to improve a mechanical strength of the nanoporous copper. A material of the reinforcement can include carbon nanotube, graphene, aluminum oxide, and silicon nitride. In one embodiment, the reinforcement comprises a plurality of carbon nanotubes, and the plurality of carbon nanotubes is disorderly and irregularly arranged. In one embodiment, the plurality of carbon nanotubes forms a film structure. The film structure can be a drawn carbon nanotube film, a flocculated carbon nanotube film, or a pressed carbon nanotube film.

The drawn carbon nanotube film comprises a plurality of carbon nanotubes joined end-to-end by van der Waals force and substantially extend along one direction. The pressed carbon nanotube film can comprise a plurality of disordered carbon nanotubes arranged along a same direction or along different directions. The flocculated carbon nanotube film can comprise a plurality of carbon nanotubes entangled and joined with each other by van der Waals force and form a network structure.

A material of the at least one active metal layer can be but not limited to zinc, aluminum, or nickel. In one embodiment, the material of the at least one active metal layer is the same as the active metal element in the copper alloy layer. During pressing the structure, the active metal layer can buffer a deformation of the copper alloy layer and play a bonding role between adjacent copper alloy layers, and thus adjacent copper alloy layers can be in closer contact. In one embodiment, a thickness of each of the at least one active metal layer is about 0.03 millimeters to about 3 millimeters.

Before step (S2), further comprising a step of degreasing the at least one active metal layer, which can make a bond force between the active metal layer and the copper alloy layer stronger. In one embodiment, the step of degreasing the at least two active metal layers by placing the active metal layer in an organic solution and ultrasonic treating the organic solvent. The organic solvent can be acetone, benzene, ethanol or the like.

In one embodiment, in step (S1), the number of the at least one active metal layer is one. In this embodiment, step (S2) comprises folding the active metal layer into a "U" type first, and then placing the copper alloy layer on a hollow portion of the "U" type to form the structure. The structure comprises a first active metal layer, a copper alloy layer and a second active metal layer. The first active metal layer and the second active metal layer are integrated structures. The first active metal layer and the second active metal layer can completely cover the copper alloy layer.

In one embodiment, in step (S2), the number of the active metal layers is larger than or equal to two. In this embodiment, placing at least one active metal layer on the first surface and at least one active metal layer on the second surface to form the structure. The active metal layer located on the first surface and the active metal layer located on the second surface in the structure are separately disposed, not an integrated structure.

In one embodiment, further comprising a step of tailoring an edge of the structure, to make the edge of the copper alloy layer overlaps with the edge of the active metal layer.

In step (S3), a method of pressing the structure is not limited, and it is only necessary to ensure that a thickness of the sandwich structure is reduced. In one embodiment, the pressing the structure can make the thickness of the composite structure less than or equal to 70% of the thickness of the structure. In one embodiment, applying pressure to the upper and lower surfaces of the structure by a rolling mill at room temperature, and making the thickness of the composite structure being half the thickness of the structure; and then tailoring 1 millimeter of the edge of the structure and removing cracks.

In step (S4), the process of alternatively folding and pressing the composite structure comprises: folding the composite structure to form a folded composite structure, and then pressing the folded composite structure. A method of folding the composite structure is not limited. In one embodiment, the composite structure is folded in half and the thickness is doubled.

Repeating the process of alternatively folding and pressing the composite structure can exponential decrease a thickness of a single copper alloy layer in the composite structure. In one embodiment, the process of alternatively folding and pressing the composite structure can decrease a thickness of the single copper alloy layer after pressing to less than 70% of a thickness of the single copper alloy layer after folding. The number of the process of folding and pressing the composite structure can depend on a type of alloying elements in the copper alloy layer and the thickness of the composite structure. The number of the process of folding and pressing the composite structure can also depend on an aperture of nanoporous copper as needed. In one embodiment, the process of folding and pressing the composite structure are repeated more than two times. In one embodiment, the process of alternatively folding and pressing the composite structure are repeated 2-10 times.

During repeating the process of alternatively folding and pressing the composite structure, the copper alloy layer is intermittently present in the precursor in a plurality of layers, and at least one active metal layer is formed between adjacent copper alloy layers.

The precursor comprises a plurality of the structures stacked in sequence. Each of the plurality of structures comprises at least two active metal layers and a copper alloy layer sandwiched between the at least two active metal layers.

In step (S5), de-alloying the precursor by corroding the precursor until the alloying elements in the copper alloy layer are dissolved to form a plurality of holes.

During repeating the process of alternatively folding and pressing the composite structure, the at least one active metal layer is broken into a plurality of portions, surfaces of two copper alloy layers between adjacent portions contacts with each other. A process of corroding the precursor includes: first the active metal layer dissolves to form a plurality of micro-gaps, and then the alloying elements in the copper alloy layer dissolve to form a plurality of nanopores. Therefore, the nanoporous copper comprises the plurality of micro-gaps and the plurality of nanopores. A morphology of the nanoporous copper can be controlled by adjusting the number of pressing, the type and concentration of a corrosion solution. In one embodiment, an aperture of the nanoporous copper is about 20 nanometers to about 200 nanometers.

The precursor can be corroded by a chemical corrosion or an electrochemical corrosion. In one embodiment, the precursor is corroded by the chemical corrosion, the chemical corrosion comprises: placing the precursor in an acidic solution for the chemical corrosion, after the active metal layer on a surface of the precursor is completely reacted and dissolved, the alloying elements in the copper alloy layer are dissolved to form the nanoporous copper. The acidic solution can be hydrochloride, sulfuric acid, or the like. A concentration of the acidic solution can be from about 0.001 mol/L to about 1 mol/L. In one embodiment, the concentration of the acidic solution is 0.1 mol/L. A corrosion time can be from about 0.5 h to about 24 h. In one embodiment, the corrosion time is about 8 h to about 24 h. In one embodiment, the corrosion time is about 5 h. In one embodiment, the corrosion time is about 10 h. In another embodiment, the corrosion time is about 24 h.

In one embodiment, the precursor is corroded by electrochemical corrosion. The electrochemical corrosion comprises: using the precursor as an anode and the active metal layer as a cathode; immersing the anode and the cathode in a salt solution; and applying a certain voltage between the anode and the cathode to dissolve the active elements in the precursor. The salt solution can be zinc sulfate, zinc chloride solution, or the like. A material of the cathode can be, but not limited to, zinc, aluminum, or nickel. In one embodiment, the material of the cathode is the same as the active element in the copper alloy layer.

Example 1

Figure 3:
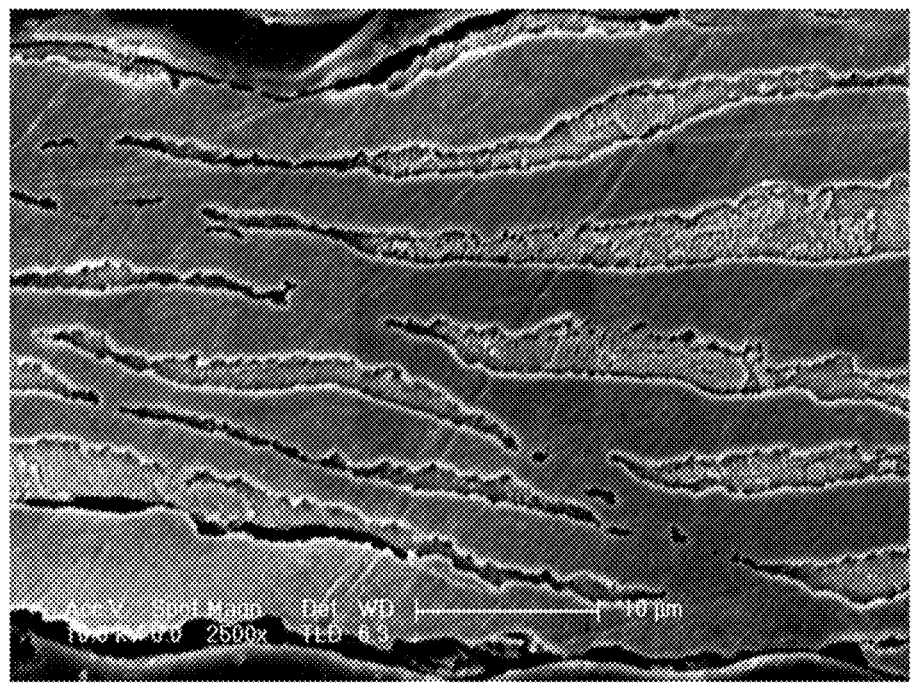
FIG. 3 is a Scanning Electron Microscope (SEM) image of Example 1 of a cross section of a first precursor in a rolling direction.
Figure 4:
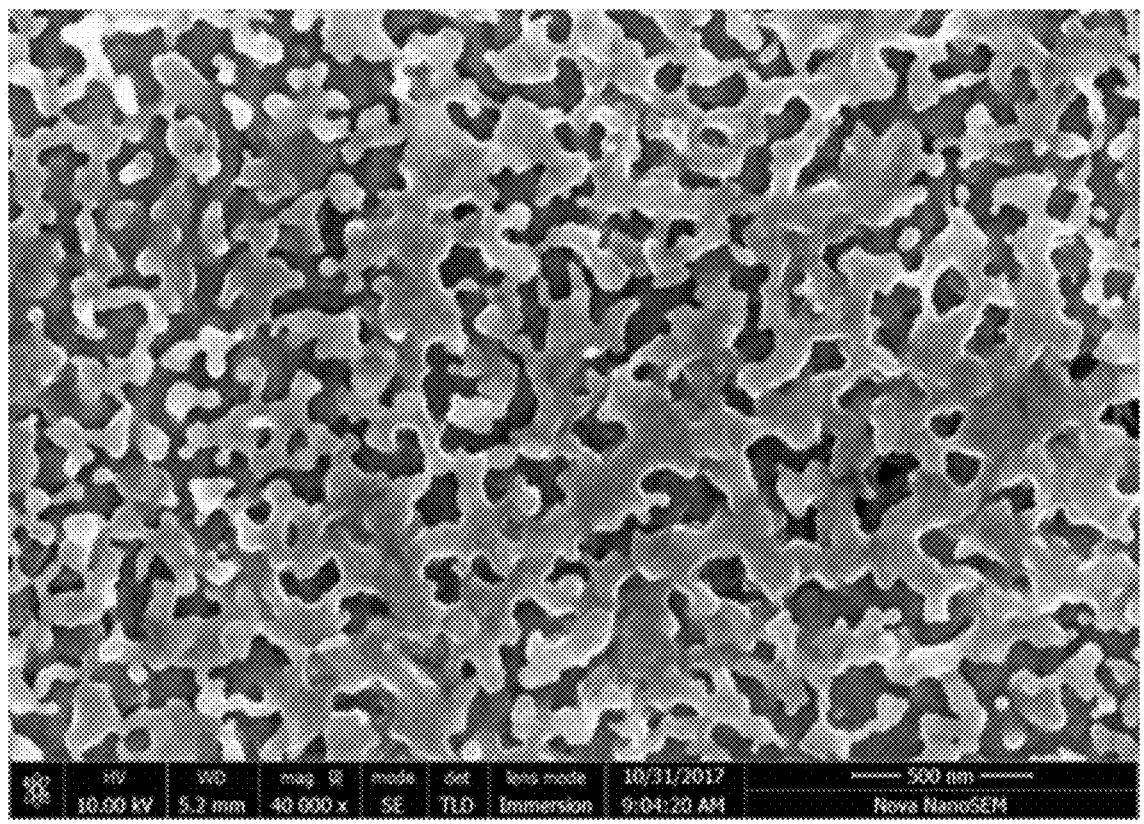
FIG. 4 is an SEM image of Example 1 of a nanoporous copper.
Figure 5:
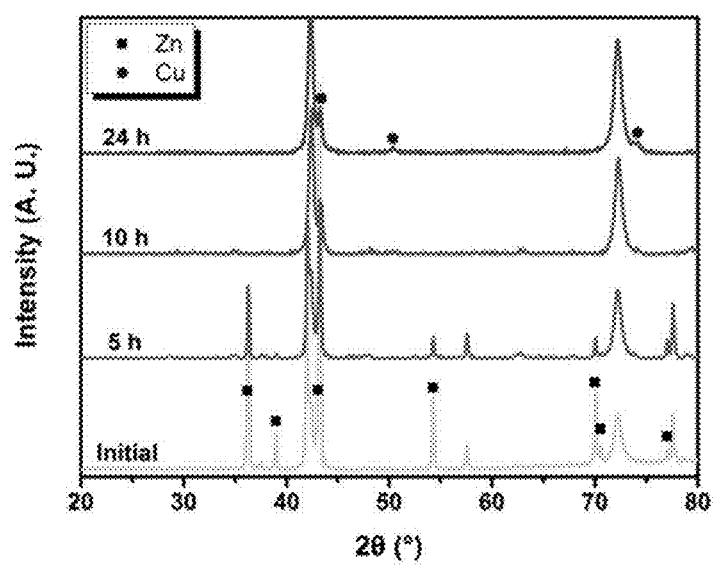
FIG. 5 is XRD spectrums of the nanoporous coppers obtained after the first precursor in FIG. 3 is corroded for 0 h, 5 h, 10 h and 24 h.

A zinc sheet with a thickness of 50 micrometers and a brass sheet with a thickness of 50 micrometers are provided. The zinc sheet is folded in half after being degreased by acetone. The brass sheet is placed in the middle of the upper and lower layers of zinc sheet after folded to form a structure, and an edge of the structure is tailored to make the edge of the brass sheet overlaps with the edge of the zinc sheet. The structure is pressed by a rolling mill at room temperature to form a first composite structure with a thickness of 50 micrometers, and the edge of the first composite structure is tailored 1 millimeter to remove cracks. The first composite structure is folded and pressed 5 times to form a first precursor. The first precursor is placed in 0.1 mol/L hydrochloric acid for 24 h, and the zinc element was removed to obtain the nanoporous copper. In FIGS. 3-5, FIG. 3 is a Scanning Electron Microscope (SEM) image of a cross section of the first precursor in a rolling direction. FIG. 4 is a SEM image of Example 1 of the nanoporous copper. FIG. 5 is XRD spectrums of the nanoporous coppers obtained after the first precursor is corroded for 0 h, 5 h, 10 h and 24 h.

Example 2

Figure 6:
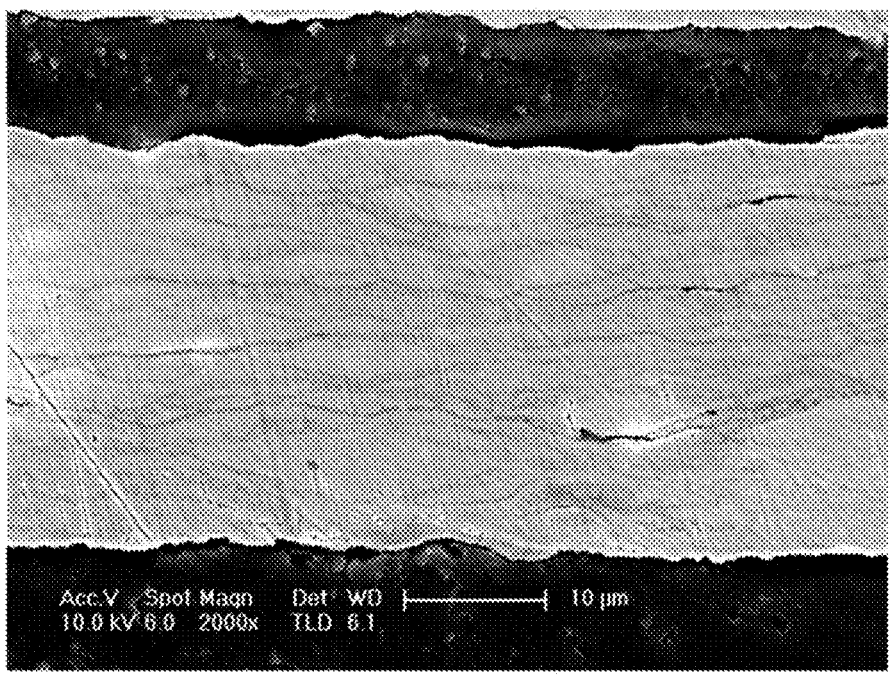
FIG. 6 is an SEM image of a cross section of Example 2 of a second precursor in a rolling direction.
Figure 7:
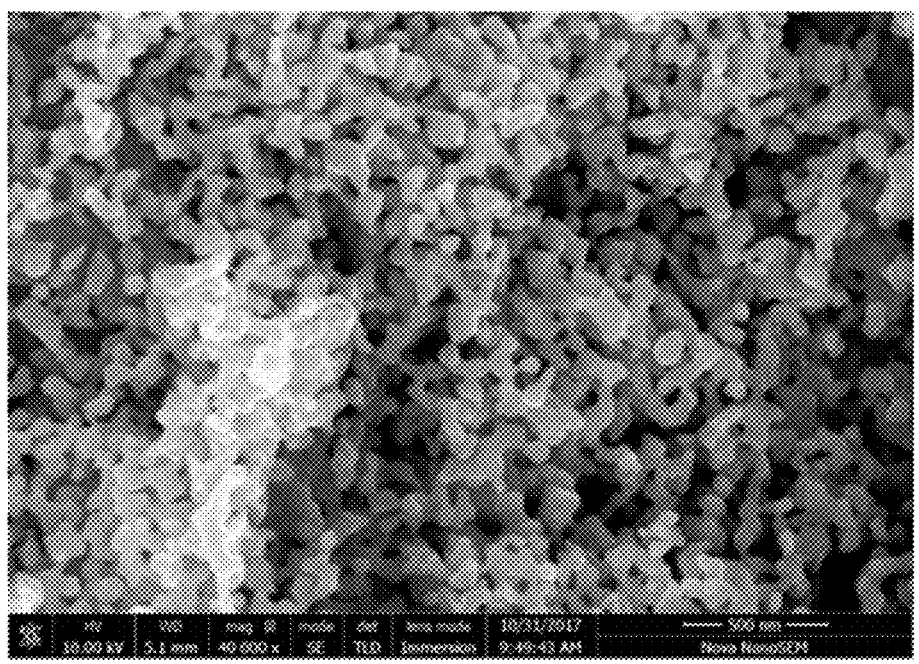
FIG. 7 is a SEM image of Example 2 of a nanoporous copper.
Figure 8:
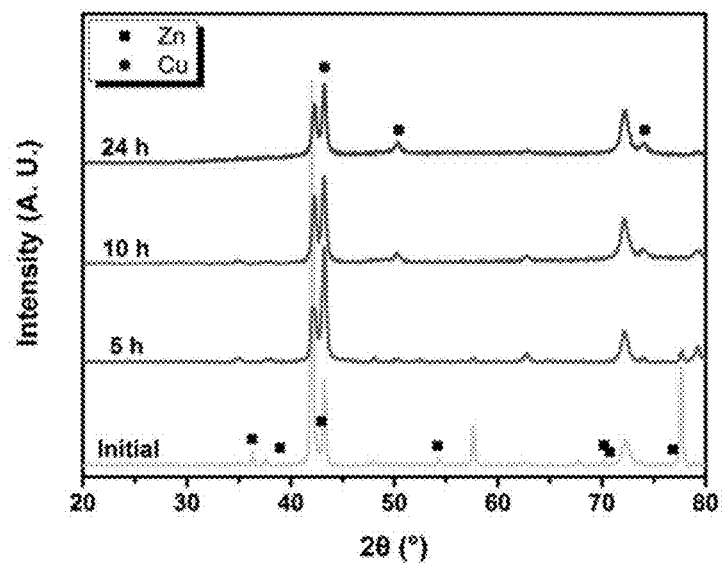
FIG. 8 is XRD spectrums of the nanoporous coppers obtained after the second precursor in FIG. 6 is corroded for 0 h, 5 h, 10 h and 24 h.

A zinc sheet with a thickness of 50 micrometers and a brass sheet with a thickness of 50 micrometers are provided. The zinc sheet is folded in half after being degreased by acetone. The brass sheet is placed in the middle of the upper and lower layers of zinc sheet after folded to form a structure, and an edge of the structure is tailored to make the edge of the brass sheet overlaps with the edge of the zinc sheet. The structure is pressed by a rolling mill at room temperature to form a second composite structure with a thickness of 50 micrometers, and the edge of the second composite structure is tailored 1 millimeter to remove cracks. The second composite structure is folded and pressed 9 times to form a second precursor. The second precursor is placed in 0.1 mol/L hydrochloric acid for 24 h, and the zinc element was removed to obtain the nanoporous copper. In FIGS. 6-8, FIG. 6 is a SEM image of a cross section of the second precursor in a rolling direction. FIG. 7 is a SEM image of Example 2 of the nanoporous copper. FIG. 8 is XRD spectrums of the nanoporous coppers obtained after the second precursor is corroded for 0 h, 5 h, 10 h and 24 h.

The difference between Example 1 and Example 2 is only that the process of folding and pressing the composite structure is repeated different times. It can be seen from FIGS. 4 and 7, the more times the process of folding and pressing the composite structure is repeated, the smaller the aperture of the nanoporous copper.

The method for making nanoporous copper has many advantages. First, the nanoporous copper is obtained by repeated pressing and dealloying, the copper alloy is large plastic deformed during repeated pressing, which can introduce a large number of defects such as dislocations, and can effectively reduce the size of the crystal. Second, the method can directly use the ready-made copper alloy, which saves the cost compared with the conventional strip casting. Third, the method does not need sophisticated instruments and complicated operations; that is conducive to streamlined operations. Fourth, when the copper alloy layer comprises the reinforcement, the method does not affect the structure of the reinforcement.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A method of making a nanoporous copper comprising:
    step (S1), providing a copper alloy layer and at least one active metal layer, wherein the copper alloy layer comprises a first surface and a second surface;
    step (S2), placing the at least one active metal layer on both the first surface and the second surface of the copper alloy layer to sandwich the copper alloy layer and form a structure;
    step (S3), pressing the structure to form a composite structure;
    step (S4), repeating a process of alternatively folding and pressing the composite structure to form a precursor; and
    step (S5), corroding the precursor to form the nanoporous copper.

2. The method of claim 1, wherein a material of the copper alloy layer comprises copper and an active metal.

3. The method of claim 2, wherein the active metal is selected from zinc, aluminum, and nickel.

4. The method of claim 1, wherein a thickness of the copper alloy layer is 0.03 millimeters to 3 millimeters.

5. The method of claim 1, wherein the copper alloy layer comprises a reinforcement, and the reinforcement is dispersed in the copper alloy layer.

6. The method of claim 5, wherein a material of the reinforcement is selected from carbon nanotube structure, graphene, aluminum oxide, and silicon nitride.

7. The method of claim 1, wherein a material of the at least one active metal layer is selected from zinc, aluminum, and nickel.

8. The method of claim 1, wherein the copper alloy layer comprises copper and an alloy element, and a material of the at least one active metal layer is the same as the alloy element in the copper alloy layer.

9. The method of claim 1, further comprising degreasing the at least one active metal layer before placing the at least one active metal layer on the first surface and the second surface.

10. The method of claim 1, wherein the number of the at least one active metal layer is one, step (S2) comprises folding the active metal layer into a "U" type first, and then placing the copper alloy layer on a hollow portion of the "U" type to form the structure.

11. The method of claim 1, wherein the number of the at least one active metal layer is larger than or equal to two, step (S2) comprises placing at least one active metal layer on the first surface and at least one active metal layer on the second surface to form the structure.

12. The method of claim 1, further comprising a step of tailoring an edge of the structure after step (S2) and before step (S3).

13. The method of claim 1, wherein pressing the structure to form the composite structure makes a thickness of the composite structure less than or equal to 70% of a thickness of the structure.

14. The method of claim 1, wherein the process of alternatively folding and pressing the composite structure comprises: first folding the composite structure to form a folded composite structure, and then pressing the folded composite structure.

15. The method of claim 14, wherein repeating the process of alternatively folding and pressing the composite structure for 2-10 times.

16. The method of claim 1, wherein the corroding the precursor to form the nanoporous copper comprises first the at least one active metal layer is dissolved to form a plurality of micro-gaps, and then the alloying elements in the copper alloy layer are dissolved to form a plurality of nanopores.

17. The method of claim 1, wherein an aperture of the nanoporous copper is 20 nanometers to 200 nanometers.

18. The method of claim 1, wherein a method of corroding the precursor to form the nanoporous copper comprises placing the precursor in an acidic solution for chemical corroding.

19. The method of claim 1, wherein a method of corroding the precursor to form the nanoporous copper comprises: immersing an anode and a cathode in a salt solution, and applying a voltage between the anode and the cathode to dissolve active elements in the precursor, wherein the anode is the precursor, and a material of the cathode is the same as a material of the at least one active metal layer.

* * * * *